Aug. 25, 1959 — C. O. CURELL — 2,901,283
MONOCOQUE SEMI-TRAILER CONSTRUCTION
Filed Oct. 19, 1954 — 5 Sheets-Sheet 1

FIG. 1.

INVENTOR.
CONRAD O. CURELL
BY James E. Toomey
ATTORNEY

Aug. 25, 1959  C. O. CURELL  2,901,283
MONOCOQUE SEMI-TRAILER CONSTRUCTION
Filed Oct. 19, 1954  5 Sheets-Sheet 2

FIG. 1a.

INVENTOR.
CONRAD O. CURELL
BY James E. Toomey
ATTORNEY

INVENTOR.
CONRAD O. CURELL
BY James E. Toomey
ATTORNEY

United States Patent Office 2,901,283
Patented Aug. 25, 1959

2,901,283

MONOCOQUE SEMI-TRAILER CONSTRUCTION

Conrad O. Curell, Highland Park, Ill., assignor to Kaiser Aluminum & Chemical Corporation, Oakland, Calif., a corporation of Delaware Application October 19, 1954, Serial No. 463,160

17 Claims. (Cl. 296—28)

This invention relates to cargo carrying vehicles. More particularly, it is concerned with providing a novel design for the body of a cargo transport and particularly the side sections thereof, whereby the cargo transport can be interchangeably used in the transporting of livestock or general cargo. The novel design of the body of the cargo transport also provides for the maximum amount of strength for the same while using a minimum amount of parts.

Various body designs for cargo carriers have been proposed in the past. These designs, however, have not been completely satisfactory for one or more reasons.

One of the principal reasons for this has been the fact that in order to make a cargo carrier of the type proposed suitable for carrying both livestock as well as general cargo, it has been necessary to utilize extremely heavy construction materials as well as parts and fittings of intricate design for the bottom and side sections thereof. Such items were needed in order to provide the rigidity and strength necessary to carry the weight and withstand abuse of the animals being transported.

Since the highway commissions of the various states specify that the cargo carrier, in its fully loaded condition, be of less than a predetermined weight when it travels the highways of the States, the weight of the cargo carrier itself becomes a very important factor. When the weight of the cargo carrier itself is excessive due to the materials used in its construction, its load carrying capacity will be reduced accordingly. Any savings in weight in the body of the carrier transport by the proper design thereof without a sacrifice in the load carrying capacity will in turn mean an increase in pay loads to the operator of the cargo transport.

A further difficulty involved in making a cargo carrier interchangeable for use both as a general cargo carrier as well as a livestock cargo carrier has been the fact that in the body designs previously employed, various structural elements having sharp projecting sections were located on the interior body of the cargo carrier. As a result, these projections would be contacted by the livestock transported and result in serious physical injuries to them. Because of their particular body construction, it was also rather difficult to clean these cargo transports after they had carried livestock so that they could be made readily available for carrying general cargo. Thorough cleaning of the cargo transport is also necessary because of the deleterious effects that can be brought about on wood or metal parts in contact with animal refuse, litter, etc.

Accordingly, it is a primary object of this invention to provide a novel cargo transport which can be used interchangeably for transporting either livestock or general cargo, and wherein the body design of the transport is such that the overall weight of the body is kept to a minimum, while its load carrying capacity is maintained at a maximum.

It is another object of this invention to provide a cargo transport body having a novel stressed skin side construction.

It is a further object of this invention to provide a novel cargo transport body provided with novel stressed skin side sections wherein the skin elements making up the side section are stressed and placed in tension under all loading conditions thereby developing full strength regardless of their thickness.

It is also an object of this invention to provide a novel means of obtaining open spaces between the stressed skin members in the areas between vertical posts so as to provide adequate ventilation for the livestock while in transit.

It is a further object of this invention to provide stiffness to these stressed skin members to enable them to resist the highly concentrated loads imposed by animals kicking the sides of the vehicle.

It is another object of this invention to provide post elements for the side sections of a cargo transport body having novel means for removably attaching panel members thereto so that the cargo transport may be readily converted to a general cargo transport from a livestock transport, or vice versa, within a minimum amount of time and with a minimum amount of effort.

It is another object of this invention to provide a novel cargo transport wherein the skin elements used in making up the stressed skin side sections of the transport body are so arranged that any projecting elements thereon are located outwardly of the interior of the transport body with the result that a substantially smooth interior body is provided, so that injury to the animals being transported will be minimized.

It is another object of this invention to provide a novel monocoque cargo transport wherein the use of extremely large and heavy metal undercarriage or chassis sections for the body thereof can be avoided, and wherein the design of the transport body permits the loads carried to be transferred from the main central section of the body to the sides thereof.

It is a further object of this invention to provide a novel cargo transport which can be readily used either as a general cargo carrier or a livestock carrier and can be converted into one or the other in a minimum amount of time and with a minimum amount of effort.

It is a further object of this invention to provide a novel cargo transport, the body construction of which is such that it lends itself to easy cleaning, particularly during the conversion of the transport from a livestock to a general cargo carrier.

It is another object of this invention to provide a novel cargo transport which can be interchangeably used both as a general and livestock carrier wherein when the transport is used as a livestock carrier, adequate ventilation is provided for the livestock.

These and other objects and advantages of the instant invention are obtained by providing in a cargo vehicle body construction the combination of a subframe or floor frame and a pair of stressed skin side frames. Each side frame includes a plurality of upright side posts arranged in spaced relationship to one another and lengthwise of the floor frame. Each of these posts is also secured at its bottom extremity to the floor frame. A plurality of groups of diagonally disposed skin elements are secured to these posts and to a top chord member as well as to an element of the floor frame which acts as a bottom chord member. The skin elements between any two adjacent side posts are all parallel and oriented at a diagonal. The orientation of these skin elements is such that the elements are subject to tensile stresses in their lengthwise direction in resisting the bending moments which result from loads applied to the trailer. Each of these skin elements is provided with alternate flattened portions in contact with the posts and outwardly projecting reinforcing rib portions disposed therebetween.

In an advantageous embodiment of the invention, each of the side posts for the vehicle body is also provided with novel grooved portions on each side thereof and adjacent the outer portion of the post. The edges of solid panel members may be easily installed in these grooved portions for the purposes of converting the cargo vehicle from a livestock to a general cargo transport in a minimum amount of time and with a minimum amount of effort.

Other objects and advantages of the instant invention will become more apparent by reference to the following detailed description when taken in conjunction with the appended drawings, wherein.

Although the novel vehicle body design of the instant invention will be discussed with particular reference to its use in cargo carriers of the tractor-trailer type which travel the highways of the various states, it is to be understood that the same design may be advantageously utilized in the manufacture of railway rolling stock and the like.

With further reference to the drawings wherein like numerals have been used to identify similar parts, the novel vehicle body of the instant invention is generally comprised of a subframe or floor frame 1 made up of a pair of side sill members 1', one for each side of the vehicle. Each side sill member 1' acts as a bottom chord member for the stressed skin side frames of the vehicle body in a manner to be more fully described hereinafter.

Each of the side sill members 1' in turn is provided with an inwardly opening channel-shaped portion 2 defined by a web 3 and top and bottom flanges 4 and 5. Flange 4 terminates in an upwardly projecting wall element 6 which in turn is provided with a shelf portion 7. Each of the sill members 1' can be advantageously made in the form of an aluminum extrusion.

Figure 2:
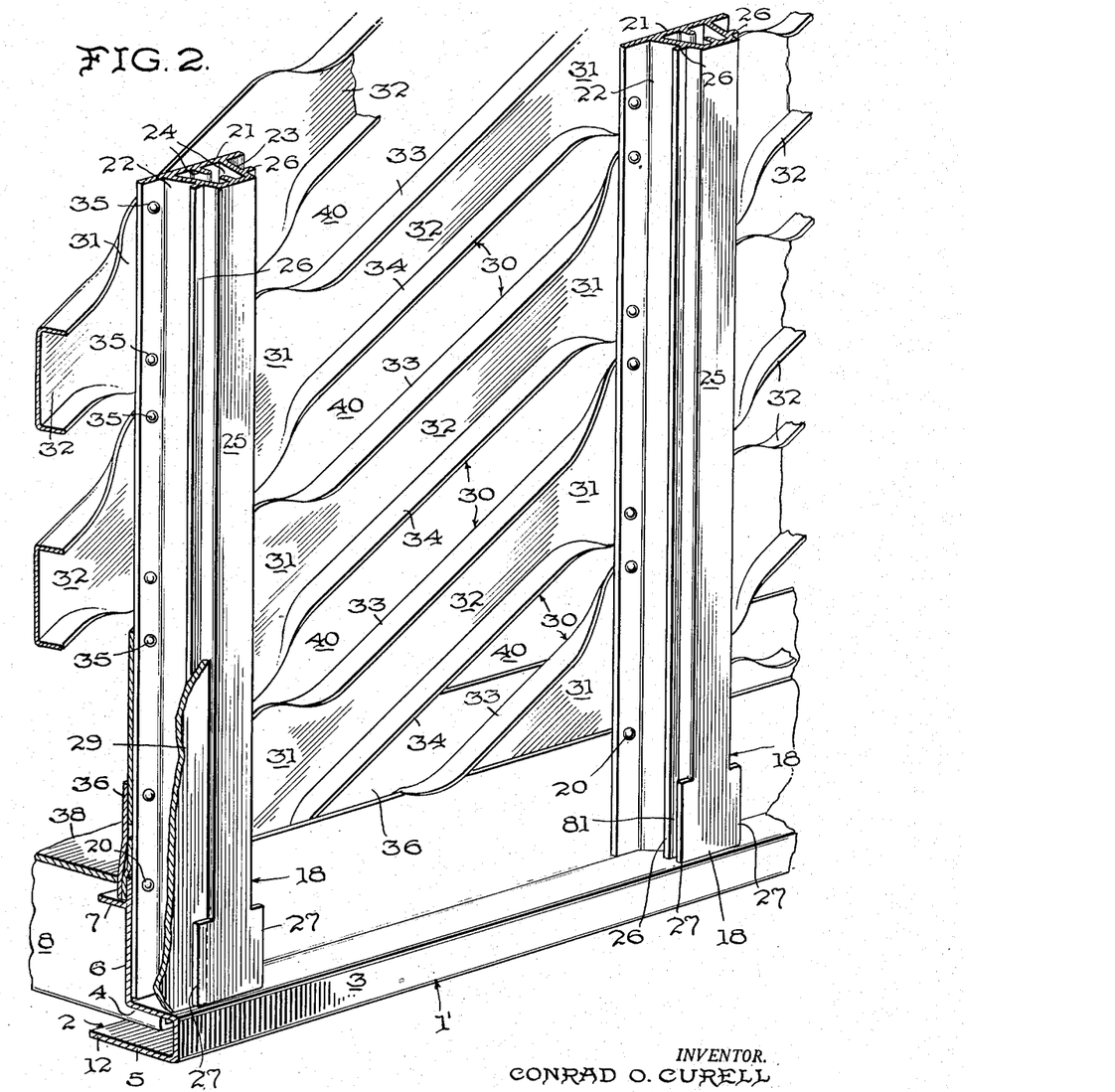
Figure 2 is a fragmentary perspective view of a portion of the floor frame and a side section of the novel vehicle body of the instant invention with certain parts thereof being shown in section.
Figure 3:
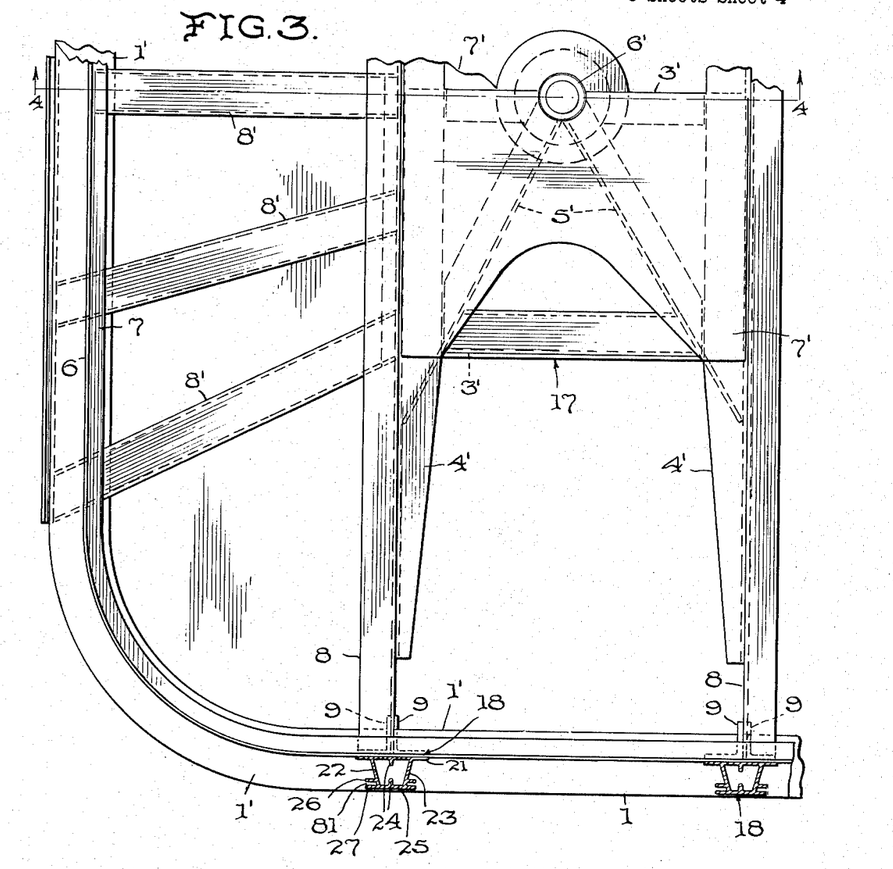
Figure 3 is a plan view of a portion of the floor frame for the novel cargo vehicle of the instant invention with certain elements therein shown in section.
Figure 4:
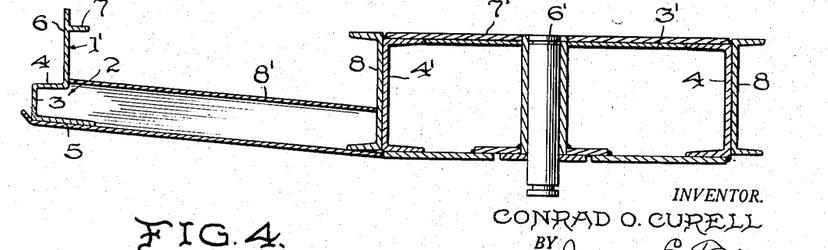
Figure 4 is a sectional view of a portion of the floor frame shown in Fig. 3 when taken along lines 4—4 thereof.
Figures 5, 6, 7, 8:
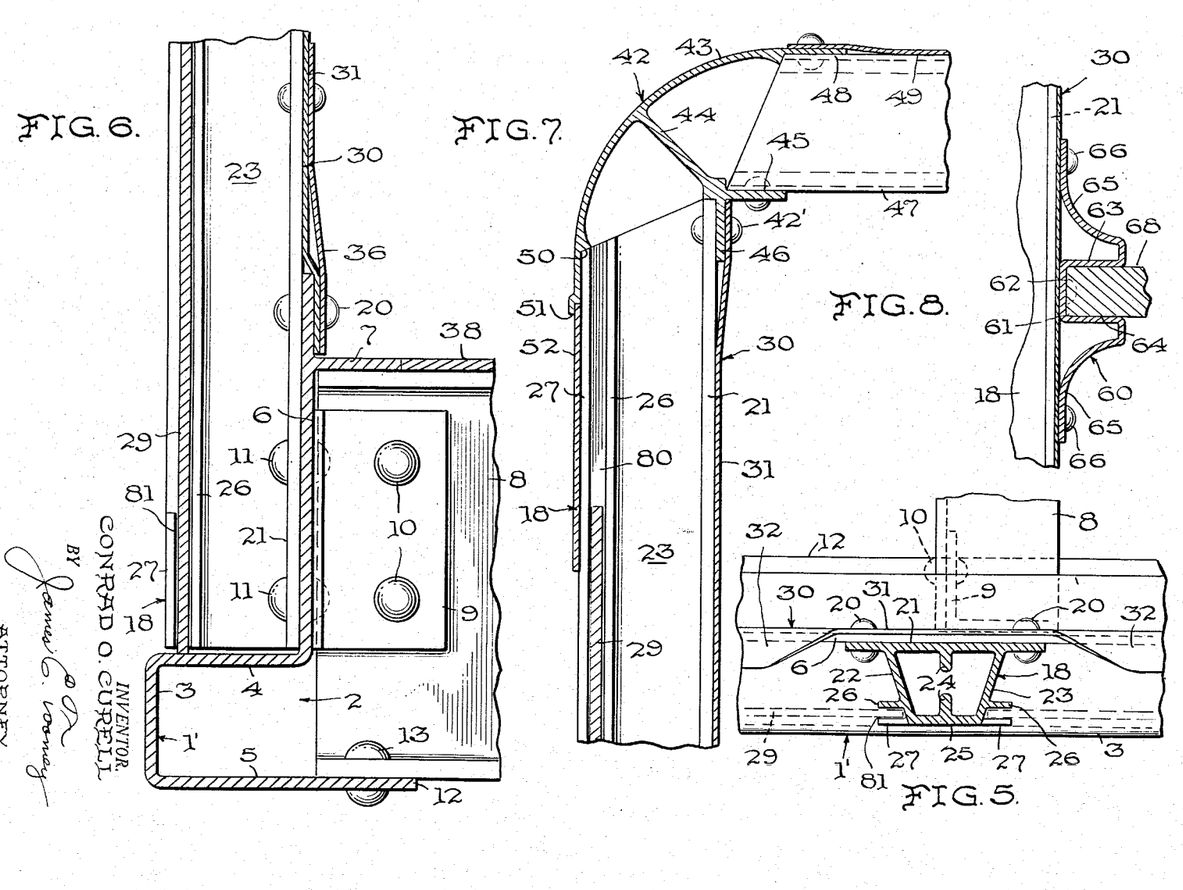
Figure 5 is a sectional view of a portion of the side framework of the novel vehicle body shown in Fig. 1 when taken along lines 5—5 thereof.
Figure 6 is a sectional view of a portion of the floor and side framework of the novel vehicle body of the instant invention shown in Fig. 1 when taken along lines 6—6 thereof.
Figure 7 is a sectional view of a portion of the side framework of the novel vehicle body of the instant invention shown in Fig. 1 when taken along lines 7—7 thereof.
Figure 8 is a sectional view taken through the side framework of the novel vehicle body of the instant invention and indicates the dividing strip and associated elements used to partition the vehicle body into an upper and lower compartment for the transport of small livestock.

As indicated particularly in Figs. 2, 3 and 6, each of the side sills 1' of the vehicle body is adapted to be joined together intermediate their ends by means of a plurality of cross or floor beams 8. These floor beams may be made in the form of channel beams, if so desired, and they also may be of extruded aluminum elements. These floor beams are advantageously secured to the side sills 1' by suitable angle clips 9. One flange of the angle clip is secured by means of the bolts or rivets 10 to the channel beam 8 with the other flange of the angle clip 9 being secured to the sill member by bolt or rivet means 11.

As indicated in Fig. 3 at the front or forward portion of the floor frame 1, each side sill 1' is curved so that the opposite ends may be brought together and secured to each other such as by welding.

The front portion of the floor frame assembly 1 of the cargo transport body is also provided with a conventional fifth wheel assembly 17 made up of the short longitudinal beams 3', cross beams 4', diagonal members 5', and a kingpin 6'. A cover plate 7' may also be used for covering the fifth wheel assembly. In addition, the front portion of the floor frame may also be provided with a plurality of additional bracing members 8'. This fifth wheel assembly of course is used for securing the cargo transport body or trailer to a suitable tractor vehicle in a manner well known in the art.

A retractable front landing gear assembly 16 is also secured, in a manner well known in the art, to the front portion of the floor frame 1, this landing gear assembly being used to support the cargo transport when it is detached from the tractor and is immobilized.

As indicated in Fig. 6, the extended portion 12 of the bottom flange 5 of the sill 1' is also advantageously used as an additional medium for securing the cross beam 8 to the sill member 1' by bolt or rivet means 13.

From the above description, it will thus be readily observed that the side sills 1 of the body vehicle as well as the cross beams 8 serve as the principal elements in the floor frame assembly 1 for the vehicle body. It is also to be observed that no exceptionally large, longitudinal beam members are employed in the construction of this underframing or floor frame assembly because of the fashion in which the weight of the loaded transport is carried due to the novel construction of the stressed skin side frames for the vehicle, which will be described more fully hereinafter. By the use of this novel side framework described hereinafter in combination with the floor framing the weight carried by the floor beams is effectively transferred to the side sections and thus eliminates the necessity of heavy beam construction in the center of the sub or floor frame and in turn reduces the weight of the vehicle body.

Figure 1:
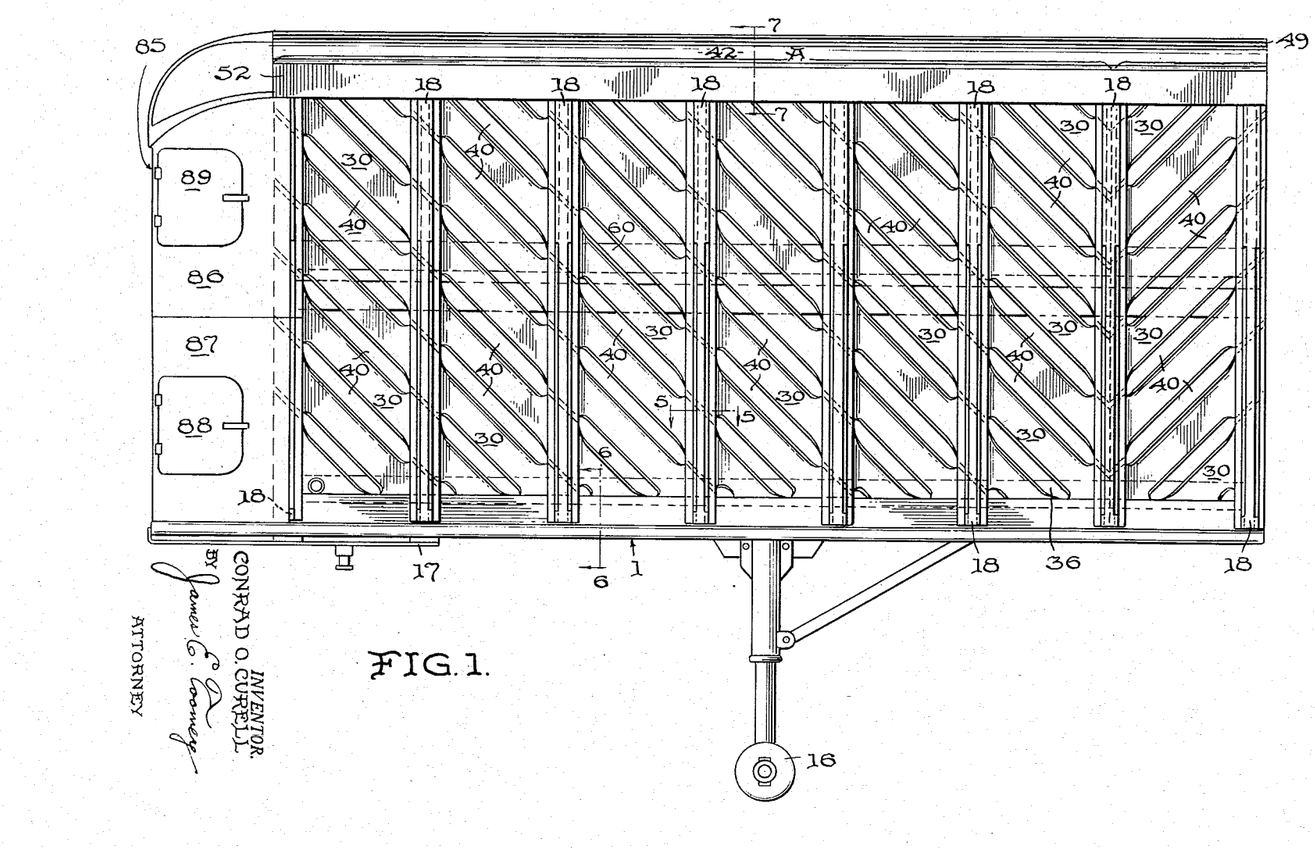
Figures 1 and 1a constitute a side elevational view of the body for the novel cargo vehicle of the instant invention.
Figure 1A:
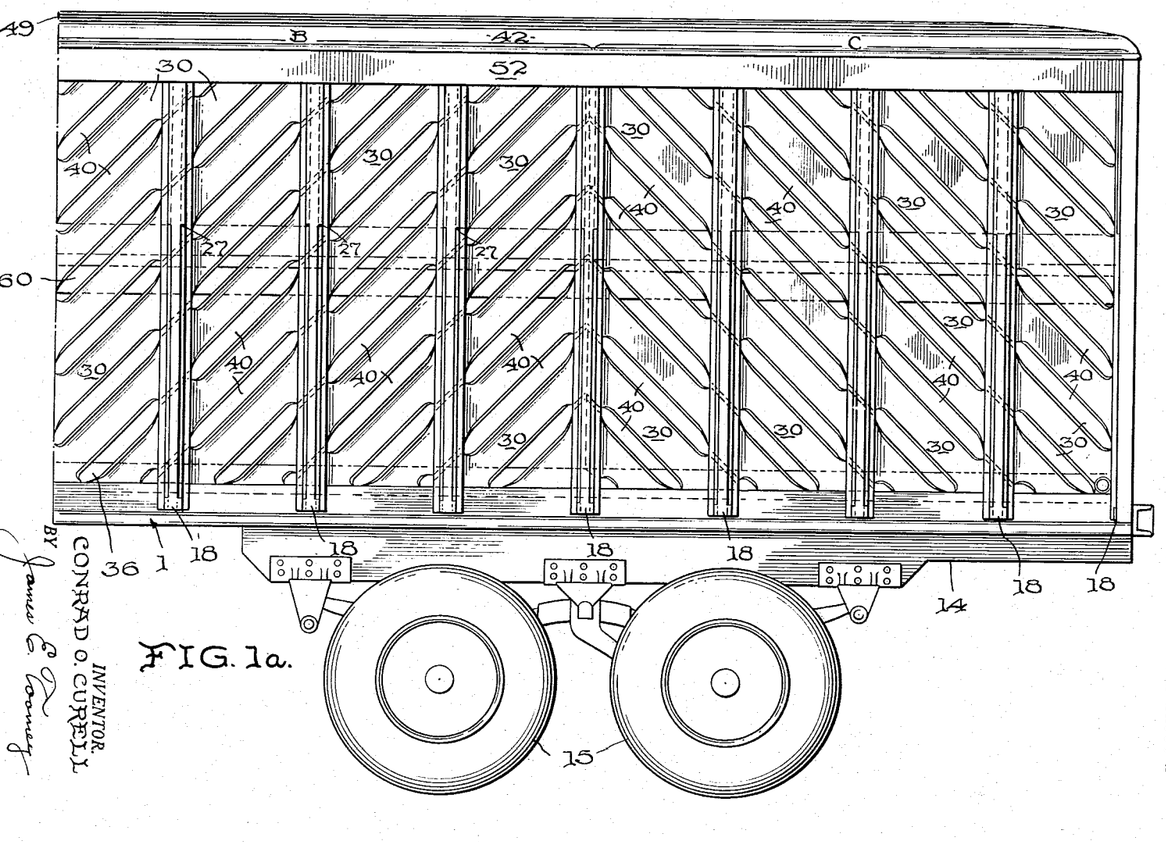

By referring to Figs. 1 and 1a, it will be noted that the back end portion of floor frame 1 is adapted to be suitably mounted upon a short, light framework 14 to which is also attached a plurality of rear wheels 15 in a manner well known in the art.

Since each of the side sections of the vehicle body is similarly constructed a description of one will suffice for both. Each of the side frame sections of the cargo transport body is comprised of a plurality of side post members 18 secured at their bottom extremities to the side sill 1'. A portion of the lower extremity of each of the side posts 18 is secured directly to the wall 6 of the side sill 1' by means of bolts or rivets 20 as indicated particularly in Fig. 2. Another portion of the bottom extremity of each of the side posts 18 is secured to the sill member 1' by means of the bolts 11 also used to secure the angle brackets 9 thereto at the time that the cross beams 8 are secured to the side sill members 1'. This provides for an extremely strong construction and it is also to be noted that in a preferred embodiment of the invention, the cross beam members 8 are secured to the side sill members 1' at approximately the same point as the side post members 18. Each of the side posts 18 is advantageously made in the form of an extruded aluminum hollow tube member. When this tube member is extruded it is so formed as to be provided with an inner flanged portion 21, outwardly extending and converging walls 22 and 23, an outer wall 25, and a pair of spaced outer flanges 26 and 27 extending from each of the walls 22 and 23. If desired, suitable reinforcing ribs 24 may also be provided for the interior of each of the hollow posts 18.

It will also be noted that although outer flanges 26 extend for the entire length of each of the posts, outer flanges 27, located at the outermost part of the posts, do not. Instead, flanges 27 project upwardly but a short distance from the bottom extremity of the posts and downwardly from the top of the posts to about midheight of the cargo transport body and a gap of substantial length exists therebetween. The gap between the several sections of flanges 27 may be created after the post has been extruded by cutting away the intermediate portion of the flanges. The reason for this is to provide a suitable means whereby thin panel members 29, such as those made of plywood or sheet metal, may be readily installed in a manner to be indicated more fully hereinafter, at the time that the cargo transport is converted from a livestock to a general cargo carrier.

Suitably disposed between and secured to the posts 18 on each side of the cargo carrier is a plurality of groups of diagonal members indicated in Figs. 1 and 1a as successive groups A, B and C of elongated diagonal members 30. The diagonal members 30 of one group, of course, are arranged at an opposing diagonal to that of the diagonal members in an adjacent group, with the adjacent groups of diagonal members converging at different posts 18 located intermediate the ends of the cargo vehicle body. By this arrangement, a novel stressed skin framework is provided on each side of the vehicle body.

Each of these elongated diagonal members 30, which also may be considered a skin member, is provided with a plurality of alternate flattened portions 31 and reinforcing channel-shaped ribbed portions 32 comprising the flanges or ribs 33 and 34. These strip-like skin members or diagonal members 30 may be made initially in the form of channel-shaped aluminum extrusions or strip and after they have been formed, the portions 31 thereon may then be flattened by deforming a portion of the legs 33 and 34 at predetermined spaced points corresponding to the spacing between the side post elements 18 in the cargo carrier. This permits quick and easy fabrication of the diagonal members.

Diagonal skin members 30 are adapted to be secured to the posts 18 by any suitable means such as by means of bolts or rivets 35 which are adapted to be inserted in suitable openings in the skin members and the inner flanges 21 of the posts. It will be noted, for example, by reference to Fig. 2 of the drawings that because of the large surfaces of flanges 21 and flattened portions 31 of the diagonal members, surface contact between the posts and skin members is provided over an exceptionally wide area.

The bottom ends of the various stressed skin members 30 are secured to the posts by means of the bolts or rivets 20 also used to secure the posts 18 to the sill member 1'. As a result skin members 30 will also be secured in turn to the sill member 1' and particularly to the wall element 6 on the sill member.

In an advantageous embodiment of the invention, a bottom side board member 36 is also adapted to be secured to the posts 18 and the top portion 6 of the sill member 1. Sheet metal floor sections 38 are also adapted to be disposed upon the several cross beams 8 and are secured thereto by any suitable means. In order to have the floor members 38 flush with a side sill 1', it will be noted that the projection 7 on the wall 6 of the side sill 1' is also advantageously employed for this purpose, projection 7 extending over the top flange of the cross beam members 8 to the point where it abuts a floor member 38.

The flanges or ribs 33 and 34 on the portions 32 of the skin members 30 rigidify and reinforce these portions of skin members located between the posts 18. Because of the inherent strength they provide, skin members 30 will satisfactorily resist an impact or blow, such as when an animal might kick the same and they will not be readily broken or fractured.

In addition, these ribs or flanges 33 and 34 also project outwardly and away from the interior of the vehicle. Thus, there are not sharp projections on the interior of the cargo vehicle body for the animals transported in the carrier to brush up against or contact with consequent injury. This diagonal arrangement of the load receiving skin members combined with the manner in which they are secured or tied to the load transmitting posts 18 and to the load transmitting side sill members 1' and the roof rail member 42 to be described later in effect forms a truss-like structure. This structure is such that under all normal conditions of loading these skin members are placed in tension with the side sills 1' acting as a bottom chord member and the roof rail member 42 acting as a top chord member and with the skin members being subject to substantially only a tensile stress. They provide in effect what may be termed a stressed skin design which develops full tensile strength regardless of the thickness of the skin elements under all conditions of loading.

Since the loads carried will be borne effectively and primarily by the side sections of the cargo vehicle and in particular by the strip-like skin members, the utilization of extremely long and heavy longitudinal beam members, which have heretofore been employed in the construction of the usual chassis or undercarriage of conventional cargo and livestock transports of the type proposed, can be eliminated. This in turn cuts down the overall weight of the cargo vehicle and allows greater cargos to be carried while still meeting the weight requirements of the various state highway commissions.

Since the ribbed sections 32 are narrower than the flattened sections 31 of the individual skin members or elements, adequate ventilation for the animals being transported is provided for, due to the large size openings 40 which occur between the rib sections 32 on the various skin elements when the skin members are diagonally arranged adjacent to one another, side by side and across the post members 18. It will also be noted, due to the use of a closed hollow post member so located that it is out of contact with animals carried by the cargo transport and extending from the trailer roof to a point below the floor level, that it is impossible for various corrosive media that is present in large quantities in cargo transports of this type to enter and cause corrosive action to take place within the post. Furthermore, the number of open joints between parts coming into contact with such corrosive media is kept to a minimum.

In connection with the reinforcing ribbed members adding strength to the individual skin members to an extent that they cannot be easily broken or bent by the animals kicking against the same, it is to be noted that one of the great sources of difficulty in prior cargo carriers with which this invention is concerned, has been damage to these skin elements when they were made of wood or thin steel slats. These are easily broken, and when broken, provide splintered portions which can be injurious to the animals transported.

A further advantage inherent in the novel stressed skin design for the sides of the cargo transport of the instant invention resides in the fact that by eliminating wooden or metal protective strips for the livestock on the inside of the transport, more space is made available for use without increasing the width of the cargo transport.

The top of each of the side post elements or members 18, and the skin elements 30 are advantageously secured to a roof rail member 42 as indicated particularly in Fig. 7 by bolt or rivet means 42'. This roof rail member, which may be of extruded aluminum, is provided with an arcuate or bowed portion 43 and a stem 44. Stem 44 terminates in a pair of angularly disposed flanges 45 and 46. Flange 46 is secured to the top of the side post member. Flange 45 is adapted to be secured to a plurality of spaced beam members 47. The top extremity of the bowed section 43 of the roof rail 42 is provided with a flanged portion 48 which is adapted to be bolted or riveted to the roof sheets 49 which rest upon the roof beams 47. The bottom extremity of the bowed or arcuate portion 43 of roof rail 42 is provided with a plurality of stepped portions 50 and 51. Stepped portion 50 is adapted to interfit with the outer flanges 27 located at the top of each post member 18. Stepped portion 51 of the roof rail 42 is adapted to fit about the upper extremity of a top side board 52. Top board 52 advantageously serves to cover the top part of the trailer or cargo transport. This top board member 52 is adapted to be secured by any suitable means to the top portion of the flanges 27 on the various side post members 18.

By referring particularly to Figs. 2, 6 and 7, it will be noted that an advantageous arrangement is provided whereby panel members 29 may be inserted between the several posts 18 so as to enclose the body portion of the cargo transport and thereby make it available for general cargo use. To do this, all that is necessary is to slip the top portion of a panel 29 in the grooves 80 between the flanged sections 27 and 26 at the top half of two adjacent side posts 18 and by lifting the panel 29 of a suitable width upward in the channel groove far enough, the panel can then be raised until the bottom extremity thereof passes across the top of the groove 81 formed by the flanged portions 27 and 26 at the bottom of each of the posts 18. Once the bottom of the panel passes the top of grooves 80, it is moved inwardly until it is aligned with grooves 81. Thereafter, panel 29 is allowed to drop downward and into grooves 81 to become securely anchored. The panels 29 are of such a height that they will advantageously extend slightly above the bottom extremity of the top board 52 on the cargo carrier so that the sides thereof will be completely enclosed. Thus, it will be observed than an advantageous arrangement is provided whereby the cargo carrier can be easily converted from a livestock carrier to a general cargo carrier in a minimum amount of time and effort. Panels 29 may be carried by suitable brackets (not shown) suspended from the floor beams 8.

In an advantageous embodiment of the invention, it is also contemplated that suitable means be provided for dividing the interior of the cargo carrier into upper and lower compartments during the transportation of small animals. For this purpose, an elongated deck support element 60 is secured to the inner surface of the post elements 18 intermediate the ends thereof. It will be noted by reference to Fig. 8 that deck support element 60 is made roughly in the shape of an M so that it is provided with an intermediate channel portion 61 defined by a web portion 62 and flanged portions 63 and 64, with each of these flange members terminating in an arcuate portion 65. These arcuate portions may be conveniently affixed to the posts 18 by bolts or rivets 66. When the opposite edges of a plurality of panel members 68 are inserted in the channel portion 61 of the deck support member 60 located on either side of the transport body, the interior of the cargo transport body can be conveniently divided into an upper and lower compartment in each of which a separate group of animals may be carried.

The front of the cargo transport is covered with a permanent metal covering 85, which may be made up of individual skin segments 86 and 87. Suitable access doors 88 and 89 of conventional design are also provided in the front covered portion of the cargo carrier so that animals located in the front of the carrier may be fed and supplied with water during shipment.

Although the novel body for a cargo transport has been disclosed and described with particular reference to its use in a vehicle adapted to travel along highways within a state, it is also obvious that the various features herein may also be employed in the construction of railway cars and other wheeled vehicles where it is desirable to transport not only livestock, but also general cargo. Because of the novel design and arrangement of the various elements making up the body of the cargo carrier, light weight metals, such as aluminum and magnesium and the various alloys thereof, may be used for practically all parts thereof without seriously affecting the load carrying capacity of the transport.

An advantageous embodiment of the invention has been herein disclosed and described. It is obvious, however, that various changes and modifications may be made therein without departing from the spirit and scope thereof as defined by the appended claims, wherein what is claimed is:

1. In a vehicle body construction, the combination of a floor frame, a plurality of upright posts arranged in spaced relationship to each other on one side of and lengthwise of said floor frame, each of said posts including an inner flanged portion and an outer portion provided with panel receiving grooves on each side thereof, a plurality of diagonally arranged skin members secured to said posts and to said floor frame, said diagonally arranged skin members being arranged in successive groups, the diagonal arrangement of the skin members in one group being different from the diagonal arrangement of the skin members in an adjacent group so as to form a stressed skin side framework for the said vehicle body, each of said diagonal members including alternate wide flattened portions in contact with the said posts and narrow flanged portions extending between the said posts, and means dividing the interior of the vehicle body into a plurality of compartments, said means including an elongated deck supporting member secured to the inner flanged portions of said posts intermediate the tops and bottoms thereof, said deck supporting member also being provided with a channel-shaped opening for receiving panel members therein.

2. The combination defined in claim 1, including panel members disposed between the said posts, the opposite sides of said panels being removably anchored in the panel receiving grooves on the sides of each of the said posts.

3. In a vehicle body construction, the combination of a floor frame comprised of side sill members and cross beam members, a plurality of upright posts arranged in longitudinal spaced relationship on one side of said floor frame, each of said posts also being secured at its bottom extremity to said floor frame, a plurality of diagonally disposed skin members secured to said posts and in turn to said floor frame, said diagonal members being arranged in successive groups, the diagonal members in each group being disposed at a different diagonal from that of the members in an adjacent group so as to form a stressed skin side framework for the said vehicle body, each of said diagonal members being comprised of alternate flattened and flanged portions, the flattened portions thereof being in contact with the posts and the flanged portions being disposed therebetween, and means dividing the interior of the vehicle body into a plurality of compartments.

4. In a vehicle body construction, the combination of a floor frame, a plurality of upright posts secured to said frame and arranged in spaced relationship to each other on one side thereof and lengthwise of said floor frame, each of said posts including an inner flanged portion and an outer portion provided with panel receiving grooves on either side and at the top and bottom thereof, a plurality of diagonally disposed skin members secured to the said posts, said diagonally disposed skin members being arranged in successive groups of differently disposed diagonal members so as to form a stressed skin side section for the said vehicle body, each of said skin members having alternate flattened portions in contact with the flanged portions of said posts and integral narrow flanged portions extending between the said posts, whereby large sized openings are provided between the skin member and a pair of posts, a panel member removably mounted within the grooves on the outer portions of a pair of posts, and means dividing the interior of said vehicle body into a plurality of compartments.

5. In a framework for the side of a vehicle body, the combination of a side sill member and a plurality of upright side post members secured thereto, each of said side post members including a flanged inner portion and an outer portion provided with panel receiving grooves at each side thereof, said panel receiving grooves also being disposed at the top and bottom of said post members, and a plurality of skin elements mounted between and secured to the flanged inner portions of said post members, each of said skin elements being disposed at an acute angle with respect to the center line of the post members, said skin elements also being provided with alternate wide flattened portions in contact with the flanged inner portions of said post members and flanged portions located therebetween, said flanged portions being of such a narrow width that openings of a large size exist between the skin elements at points where they are disposed between the post members, and panel members removably mounted in the grooves in adjacent post members for enclosing the side of the vehicle body.

6. In a vehicle body construction, the combination of a floor frame, a plurality of upright posts arranged in spaced relationship on one side of and lengthwise of said floor frame, each of said posts being secured at its bottom extremity to the floor frame and including an inner flanged portion and an outer portion provided with panel receiving grooves on each side thereof, a plurality of diagonally disposed skin elements arranged in successive groups secured to the said posts and said floor frame, the skin elements of each group being arranged in side by side relationship to each other and at an opposite diagonal to that of the skin elements in an adjacent group, whereby said posts and said groups of diagonal skin members form a stressed skin side framework for the said vehicle body, and each of said skin elements including alternate wide flattened and narrow reinforcing flanged portions, the flattened portion of a skin element being secured to and in contact over a wide area with the inner flanged portion of a post and the flanged portions thereof extending between a pair of posts, whereby large sized ventilation openings are provided between the individual skin elements and a pair of posts.

7. The combination defined in claim 6, including solid panel members removably mounted between a pair of posts with the opposed edges thereof being disposed in the grooves of said posts.

8. In a stressed skin framework for the side of a vehicle body, the combination of a roof rail member, a side sill member and a plurality of upright side posts secured thereto, each of said side posts having a flanged inner portion and an outer portion provided with panel receiving grooves on each side thereof, and a plurality of skin elements mounted between and secured to the flanged inner portions of said side posts and to the roof rail and side sill members, each of said skin members being arranged at an acute angle with respect to the center line of a post and each of said skin elements also being provided with alternate flattened portions in contact with the flanged inner portion of the posts and outwardly projecting reinforcing flanged portions therebetween.

9. The combination defined in claim 8, including panel sheets removably disposed in panel receiving grooves in the said side posts so as to enclose the side of the vehicle body.

10. In a stressed skin framework for the side of a vehicle body, the combination of a side sill member and a plurality of upright side posts secured thereto, a plurality of skin elements mounted between and secured to the inner surface of said side posts, each of said skin elements being arranged side by side and at an acute angle with respect to the center line of a post, each of said skin elements also being provided with alternate flattened portions in contact with the side posts, and integral reinforcing flanged portions located intermediate said side posts, said flanged portions of said skin elements being of such a narrow width that openings of a large size exist between the skin elements at the points where they are disposed between the side posts.

11. The combination defined in claim 10, including solid panel members removably disposed between said side posts for enclosing the side of a vehicle body.

12. In a vehicle body construction, the combination of a floor frame, a plurality of upright posts arranged in longitudinal spaced relationship to each other on one side of said floor frame, each of said posts also being secured at its bottom extremity to the said floor frame, a plurality of diagonally disposed skin elements arranged in successive groups secured to the said posts and in turn to said floor frame, the skin elements in each group being arranged side by side and at an opposite diagonal to that of the skin elements in an adjacent group so as to form a stressed skin side framework for the said vehicle body, and each of said skin elements including alternate wide flattened portions and narrow reinforcing flanged portions, the flattened portions of said skin elements being in contact with said posts and the flanged portions thereon extending between the said posts, whereby large sized openings are provided between both the skin elements and a pair of posts.

13. In a vehicle body, a chassis-less body construction comprising the combination of a cargo receiving floor frame, said floor frame being comprised of side sill members and cross beam members, a plurality of upright posts arranged in longitudinal spaced relationship on one side of said floor frame, each of said posts also being secured at its bottom extremity to the floor frame, a plurality of diagonally disposed skin elements secured to the said posts and in turn to said floor frame, said skin elements being arranged in successive groups of differently arranged diagonal skin elements so as to form a stressed skin side framework for the vehicle body, the arrangement of said diagonally disposed skin elements being such that said diagonal skin elements are subject to substantially only a tensile stress during normal cargo carrying conditions, each of said diagonally disposed skin elements being in contact with said posts over a large area and further, including flanged portions extending between the said posts, said skin elements comprising the principal load bearing structural elements in said vehicle body.

14. In a vehicle, a stressed skin body construction comprising the combination of a floor frame, a plurality of upright posts arranged in longitudinally spaced relation to each other on each side of said floor frame, each of said posts also being secured at its bottom extremity to said floor frame, a plurality of diagonally disposed sheet-like elements arranged in successive groups on each side of said floor frame and secured to said posts and in turn to said floor frame, the sheet-like elements in each group being arranged at an opposing diagonal to those in an adjacent group with the sheet-like elements in adjacent groups also converging at points intermediate the ends of the vehicle body, all of said elements comprising stressed skin side frameworks for said vehicle body, the arrangement of the successive groups of said sheet-like elements being such that when said vehicle is carrying a cargo, said sheet-like elements being subject to substantially only a tensile stress and comprise the principal load supporting elements in said stressed skin body construction, said sheet-like elements also including alternate flat portions secured to said posts and flanged portions disposed between said posts, the flanges on said flanged portions extending outwardly away from the interior of said vehicle body and reinforcing said sheet-like elements between said posts.

15. In a stressed skin framework for the side of a vehicle body the combination of a load transmitting side sill member and a plurality of load transmitting upright side posts secured thereto, a plurality of parallel and diagonally disposed load receiving strip-like skin members mounted between and secured to the said side posts and said sill member, the portions of adjacent strip-like skin members disposed between the posts being separated from each other to provide ventilation openings therebetween, and said strip-like skin members being so arranged at an angle with respect to the vertical center line of said side posts that each of said strip-like skin members is subject to substantially only a tensile stress when said vehicle body is loaded and in a normally stressed cargo carrying condition, said side sill member, said side posts and said strip-like skin members comprising a load supporting truss-like structure in which said strip-like skin members are stressed and comprise the principal load supporting elements of said truss-like structure, said strip-like skin members receiving the loads from said side sill member and said side posts.

16. The combination as claimed in claim 15, including panel-like closure members removably mounted between said side posts, said posts including means positioning said panel-like closure members in removably fixed relation on the side of said vehicle body.

17. The combination as claimed in claim 15 wherein the portions of said strip-like members disposed intermediate said side posts are provided with reinforcing means.

References Cited in the file of this patent

UNITED STATES PATENTS

| | | |
|---|---|---|
| 1,224,052 | Worth | Apr. 24, 1917 |
| 1,685,106 | Thompson et al. | Sept. 25, 1928 |
| 1,826,859 | Anderson | Oct. 13, 1931 |
| 1,841,240 | Collins | Jan. 12, 1932 |
| 2,117,577 | Simning | May 17, 1938 |
| 2,384,965 | Reid | Sept. 18, 1945 |
| 2,400,253 | Ostlund | May 14, 1946 |
| 2,600,140 | Torseth | June 10, 1952 |
| 2,607,301 | Lundvall | Aug. 19, 1952 |